United States Patent
Yoshida et al.

[11] Patent Number: 5,879,720
[45] Date of Patent: Mar. 9, 1999

[54] GRANULATING DEVICE FOR THERMOPLASTIC RESIN

[75] Inventors: Minoru Yoshida; Hideki Mizuguchi; Nobuhisa Kobayashi; Masaharu Ishida, all of Hiroshima, Japan

[73] Assignee: The Japan Steel Works, Ltd., Tokyo, Japan

[21] Appl. No.: 20,383

[22] Filed: Feb. 9, 1998

Related U.S. Application Data

[62] Division of Ser. No. 747,813, Nov. 13, 1996, Pat. No. 5,747,077.

[30] Foreign Application Priority Data

Nov. 15, 1995 [JP] Japan .................................. 7-296679

[51] Int. Cl.⁶ .................................................. B29B 9/06
[52] U.S. Cl. ............................ 425/183; 425/67; 425/313
[58] Field of Search ............................ 425/67, 311, 313, 425/183; 264/142

[56] References Cited

U.S. PATENT DOCUMENTS

| | | | |
|---|---|---|---|
| 2,858,851 | 11/1958 | Holl | 137/625.48 |
| 3,230,582 | 1/1966 | Hoffman et al. | 425/311 |
| 3,349,433 | 10/1967 | Schippers | 425/313 |
| 3,436,449 | 4/1969 | Treu et al. | 264/142 |
| 3,589,163 | 6/1971 | Byrne et al. | 425/185 |
| 3,590,678 | 7/1971 | Hasten et al. | 83/593 |
| 3,947,195 | 3/1976 | Fritsch | 425/190 |
| 4,984,977 | 1/1991 | Grimminger et al. | 425/382.3 |
| 5,067,885 | 11/1991 | Stevenson et al. | 425/382.3 |
| 5,219,588 | 6/1993 | England et al. | 425/382.3 |
| 5,224,838 | 7/1993 | Baumgarten | 425/382.3 |
| 5,238,385 | 8/1993 | Johnson | 425/183 |
| 5,261,454 | 11/1993 | Pavlica et al. | 137/625.48 |
| 5,650,179 | 7/1997 | Schier | 425/313 |

FOREIGN PATENT DOCUMENTS

| | | |
|---|---|---|
| 0698461 | 2/1996 | European Pat. Off. . |
| 4306014 | 2/1994 | Germany . |
| 61-185416 | 8/1986 | Japan ................ 425/311 |
| 4-310707 | 11/1992 | Japan ................ 425/311 |
| 5-111951 | 5/1993 | Japan ................ 425/382.3 |

*Primary Examiner*—Robert Davis
*Attorney, Agent, or Firm*—Sughrue, Mion, Zinn, Macpeak & Seas, PLLC

[57] ABSTRACT

A granulating device, and a granulating method for thermoplastic resin material, in which a screw type kneading and extruding machine for kneading, extruding and melting the thermoplastic resin material, a die holder connected to a front end portion of the screw type kneading and extruding machine, the die holder including a passage through which the melted resin material folws, a change-over valve and at least two outlets, the passage selectively connected to the outlets with the change-over valve, a first and a second dies, for forming the melted resin material into a plurality of pieces of string, connected respectively to the outlets to adapt to different ranges of viscosity of the melted resin material, and a first and a second cutter units including cutters moved respectively along extruding planes of the first and second dies to cut the string-shaped resin material into small pieces, and cooling and solidifying sections for cooling and solidifying the small pieces of thermoplastic resin material.

6 Claims, 4 Drawing Sheets

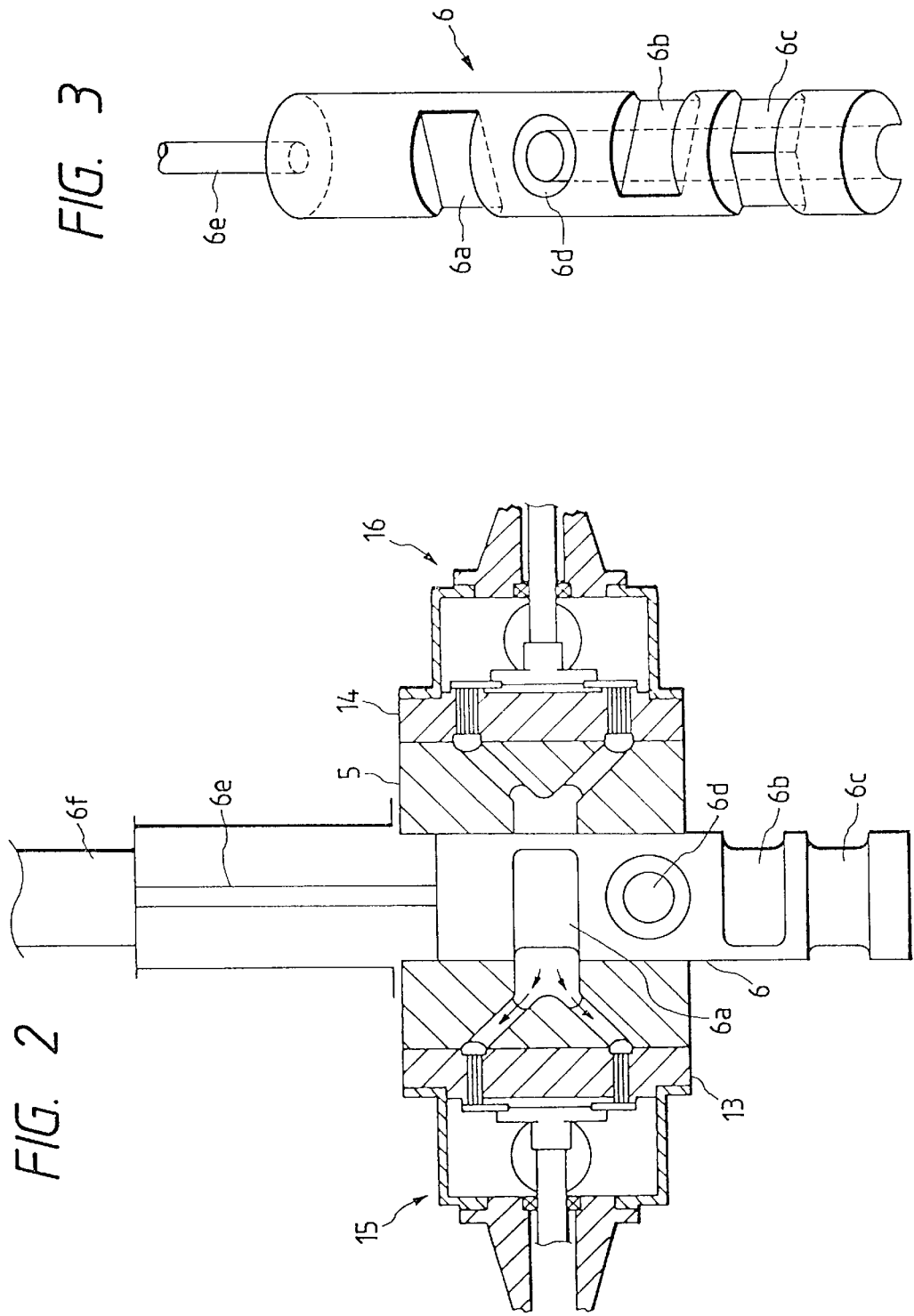

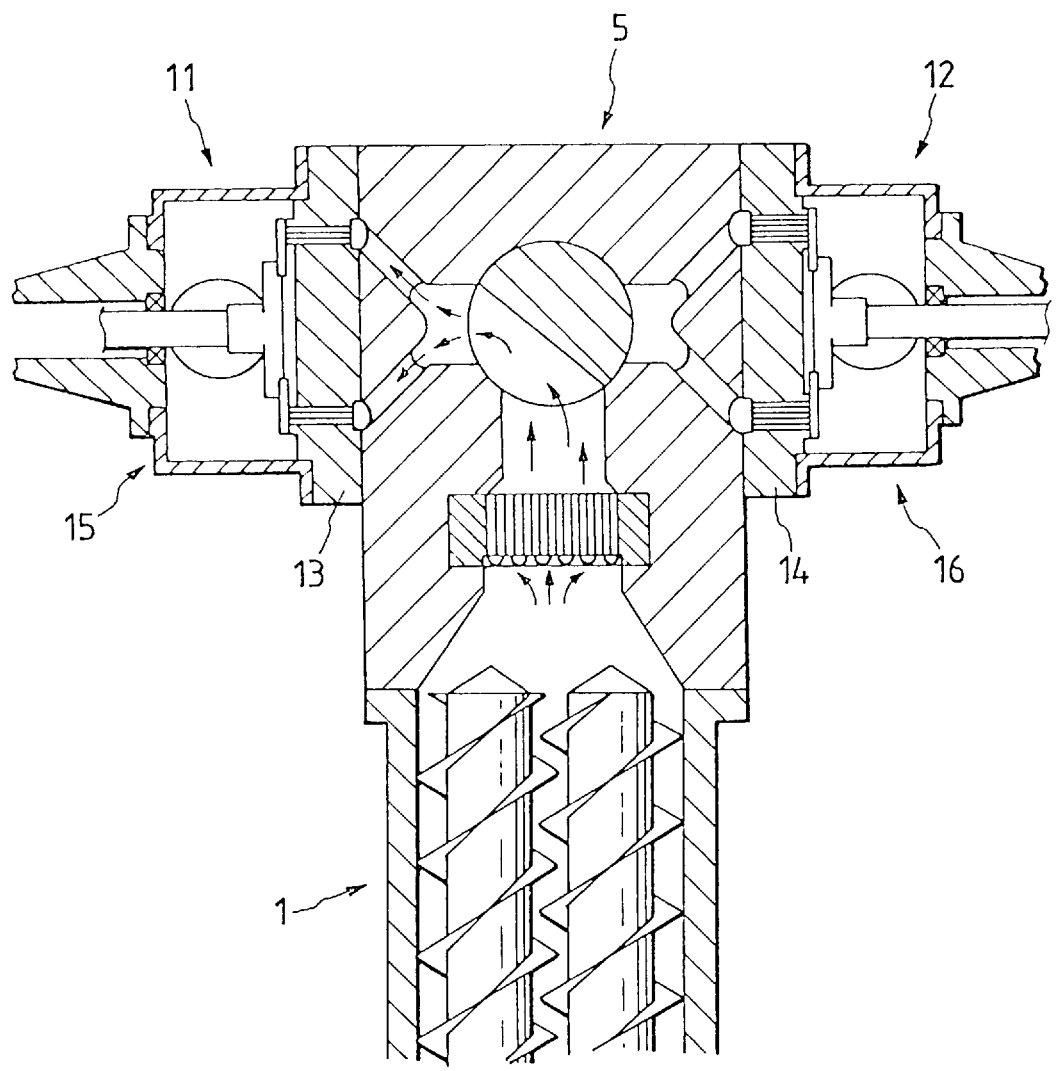

GRANULATING DEVICE FOR THERMOPLASTIC RESIN

This is a divisional of application Ser. No. 08/747,813, filed Nov. 13, 1996, and now U.S. Pat. No. 5,747,077.

BACKGROUND OF THE INVENTION

1. Field of the Invention

The present invention relates to a method and apparatus for continuously granulating thermoplastic resin material with a screw type kneading and extruding machine and a granulating device.

2. Background

In order to granulate a large quantity of thermoplastic resin (not less than 1000 kg/Hr) that has been polymerized by a polymerizing apparatus, in general, one set of screw type kneading and extruding machine and one set of granulating device are used being combined into one unit. In the screw type kneading and extruding machine, a single shaft screw or two shaft screws are rotated in a cylinder, and when necessary, a gear pump is attached to a front end portion of the screw type kneading and extruding machine so as to intensify the extruding function. The granulating device is formed into a substantial disk-shape. On the disk-shaped component of the granulating device, there are formed a large number of nozzles penetrating the disk-shaped component in the thickness direction, and these nozzles are annularly distributed on the disk-shaped component. The granulating device includes: a die attached onto a front end plane of the screw type kneading and extruding machine; and a cutter unit driven and moved along an outer surface of the die (an extruding plane). The granulating device is composed as described above, and there are two types of granulating devices. One is a submerged type granulating device, and the other is an aerial type granulating device.

By the screw type kneading and extruding machine and the granulating device constructed as described above, pellets of thermoplastic resin are made as follows. Powdered thermoplastic resin material is continuously fed from a polymerizing apparatus. Then the thermoplastic resin material is kneaded and melted by the screw type kneading and extruding machine. After that, the thermoplastic resin material is extruded from the nozzles of the die being formed into the shape of pieces of string.

In the granulation of thermoplastic resin, in order to simplify the arrangement of the apparatus and also in order to enhance the efficiency of the operation of the apparatus, one set of polymerizing apparatus is directly connected with one set of screw type kneading and extruding machine. In this case, after the resin material has been polymerized by the polymerizing apparatus, it is directly fed to the screw type kneading and extruding machine and pelletized by the granulating device.

Since the conventional granulating device is constructed as described above, the following problems may be encountered. When the physical property, that is, the viscosity of thermoplastic resin material fed from the polymerizing apparatus is greatly changed, or alternatively when a quantity of thermoplastic resin material fed from the polymerizing apparatus is greatly changed, it is impossible to normally conduct granulation with one type die. When granulation is conducted with one type die, the following problems may be caused. It is impossible to produce spherical pellets, and comma-shaped pellets are produced; plate-shaped pellets are produced; pellets are curled; thread-shaped objects are attached to pellets; and pellets are not separated from each other but they are connected to each other. In this way, defective pellets are produced.

In general, the granulating device including a die and cutter unit is designed so that the processing capacity of the granulating device is equal to the processing capacity of the screw type kneading and extruding machine. That is, when the viscosity of resin material fed from the polymerizing apparatus changes in a wide range, the specification of the granulating device is determined so that the resin material of high viscosity, which requires much energy when it is processed in the screw type kneading and extruding machine, can be normally granulated. In the case of processing resin material of high viscosity, the pressure loss is relatively large when it is fluidized and extruded from the nozzles of the die. Accordingly, in order to reduce the pressure loss, the number of the nozzles is increased, so that the flow velocity is decreased. In the case of processing resin material of low viscosity, the pressure loss is relatively small when it is fluidized and extruded from the nozzles of the die. Accordingly, the resin pressure in the die is low. Therefore, the resin material is extruded from the die as a soft and weak string-shaped resin. For this reason, it is difficult to smoothly cut the resin material with a cutter, and defective pellets are produced. In order to take countermeasure against the above problem, the number of nozzles is reduced, so that the flow velocity of resin in the nozzle can be increased. In accordance with the difference of the die and also in accordance with the difference of the flow velocity of resin material, the number of cutters of the cutter unit or the rotating speed (the moving speed) of the cutters is differently determined. That is, in the case of processing resin material of high viscosity, the number of cutters is reduced and the rotating speed is increased, because resin material extruded from a large number of nozzles at a low flow velocity is cut. In the case of processing resin material of low viscosity, the number of cutters is increased and the rotating speed is decreased, because resin material extruded from a small number of nozzles at a high flow velocity is cut.

Thermoplastic resin is produced by a series of polymerizing apparatus while the polymerizing condition is changed so as to produce resin materials of different viscosity. That is, several types of resin materials, the viscosity ranges of which are different, are successively or alternately produced. In some cases, due to a decrease in the demand, a reduction of output is forced. However, in any cases, the polymerizing apparatus is not stopped even in a short period of time, but it is continuously operated by changing the polymerizing condition in accordance with the change in the production. It is necessary for the screw type kneading and extruding apparatus directly connected with the polymerizing apparatus and also it is necessary for the granulating device attached to the screw type kneading and extruding apparatus, to be operated for conducting granulation normally in accordance with a change in the viscosity of resin material fed from the polymerizing apparatus and a change in the quantity of resin material fed from the polymerizing apparatus. That is, it is necessary for the screw type kneading and extruding apparatus and the granulating device to produce pellets, the shapes of which are not defective. When the resin material feeding condition is changed, the screw type kneading and extruding machine can be adopted to the change by changing the number of revolutions of the screw or the temperature condition of the cylinder. Although the granulating device can be adopted to a narrow range of change by changing the rotating speed of cutters, however, it is impossible for the granulating device to be adopted to a wide range of change. Consequently, it is possible to consider preparing several granulating devices, the applicable viscosity ranges of which are different, and replacing the granulating device in accordance with the condition. However, in order to replace the granulating device, it is necessary to temporarily stop the operation of the screw type kneading and extruding machine. However, in the case of a screw type kneading and extruding machine directly connected with a polymerizing apparatus, the screw type kneading and extruding machine can be stopped only for a short period of time since the polymerizing apparatus is continuously operated. In such a short period of time, it is impossible to replace the granulating device. When the granulating device is replaced if necessary, operation of the polymerizing apparatus is reduced, and resin material polymerized in the process of the reduced operation is discharged. In some cases, the discharged resin material is wasted.

SUMMARY OF THE INVENTION

The present invention has been accomplished to solve the above problems. It is an object of the present invention to provide a granulating method and granulating device for thermoplastic resin capable of operating continuously to granulate thermoplastic resin material to be produced in a wide range of viscosity without stopping a portion of the apparatus and without discharging a large quantity of resin material outside in order to prevent the discharged resin material from being wasted.

The present invention is to provide a granulating method for thermoplastic resin including the steps of: kneading and melting thermoplastic resin material with a screw type kneading and extruding machine; extruding the thermoplastic resin material from a die in the form of a plurality of pieces of string; cutting the plurality of pieces of string into small pieces with a cutter unit; and cooling and solidifying small pieces of string of thermoplastic resin, wherein one of the dies and one of the cutter units are selected from at least two dies and two cutter units attached to a front end portion of the screw type kneading and extruding machine so as to conduct granulation in accordance with the viscosity of resin material, and one die and one cutter unit are provided for the use of resin material of low viscosity and the other die and the other cutter unit are provided for the use of resin material of high viscosity.

To explain in detail, the present invention is to provide a granulating method for thermoplastic resin in which it is possible to change over from one set of die and one set of cutter unit to the other set of die and the other set of cutter unit during the operation of the screw type kneading and extruding machine.

The granulating device for thermoplastic resin of the present invention includes: dies for forming melted resin material into a plurality of pieces of string, connected with a front end portion of a screw type kneading and extruding machine for kneading and extruding thermoplastic resin material; cutter units for cutting string-shaped resin material into small pieces with cutters moved along extruding planes of the dies, the small pieces of thermoplastic resin material being cooled and solidified after the completion of cutting; and a die holder attached to a front end portion of the screw type kneading and extruding machine, the die holder including at least two outlets and a change-over valve, wherein the outlets are respectively connected with the dies and cutter units which are adaptable to different ranges of viscosity.

To explain in detail, the present invention is to provide a granulating device for thermoplastic resin in which at least one set of die and one set of cutter unit are arranged in such a manner that an extruding plane of the die is horizontally disposed while it is directed upward.

BRIEF DESCRIPTION OF THE DRAWINGS

FIG. 2 is a cross-sectional view taken on line II—II in FIG. 1;

FIG. 3 is a perspective view of a change-over valve rod;

FIG. 4 is a cross-sectional plan view showing an applied example of the apparatus shown in FIG. 1.

DETAILED DESCRIPTION OF THE PREFERRED EMBODIMENTS

Figure 1:
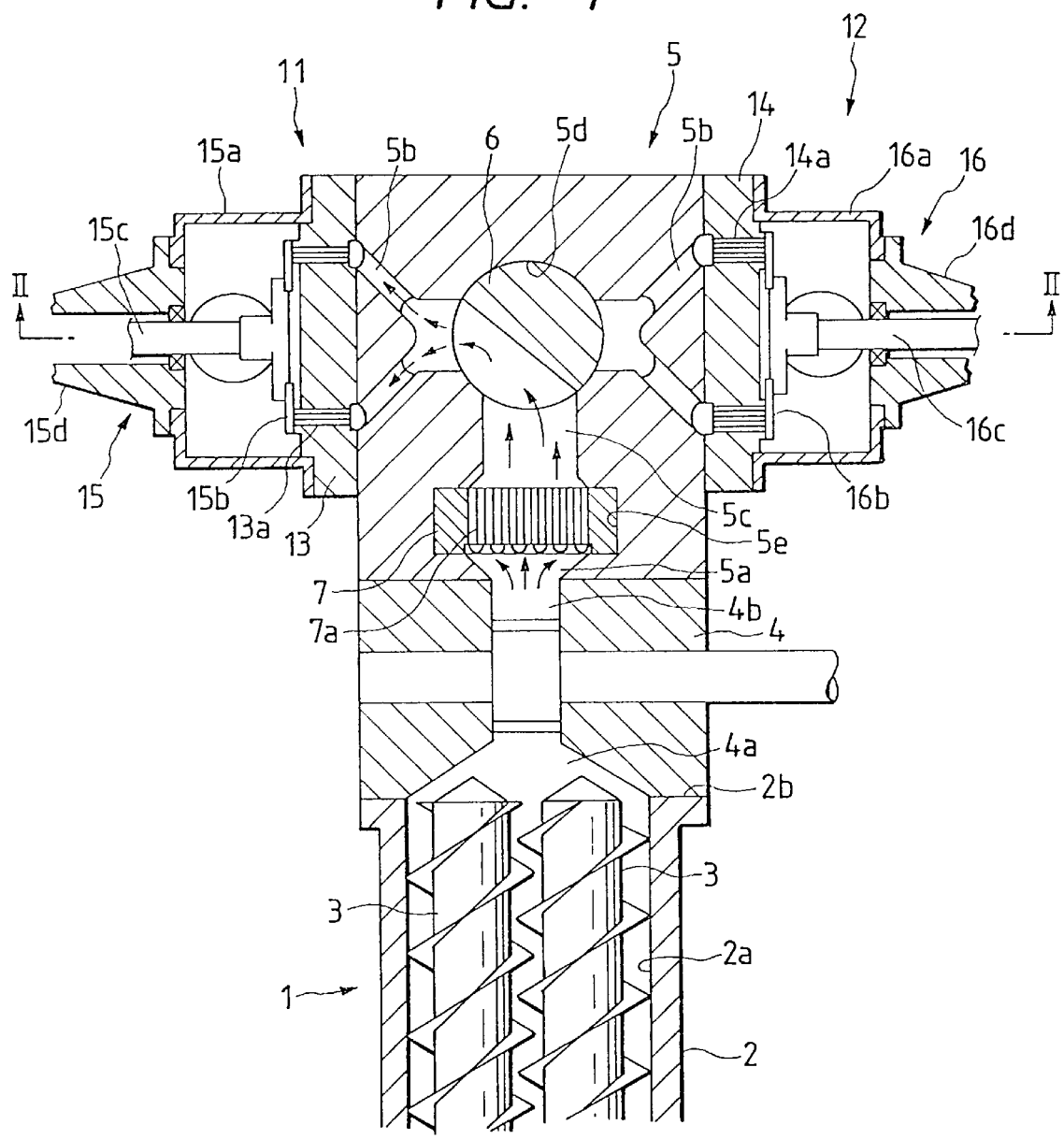
FIG. 1 is a cross-sectional plan view of a granulating device for thermoplastic resin of a first embodiment of the present invention illustrating its primary construction.
Figure 5:
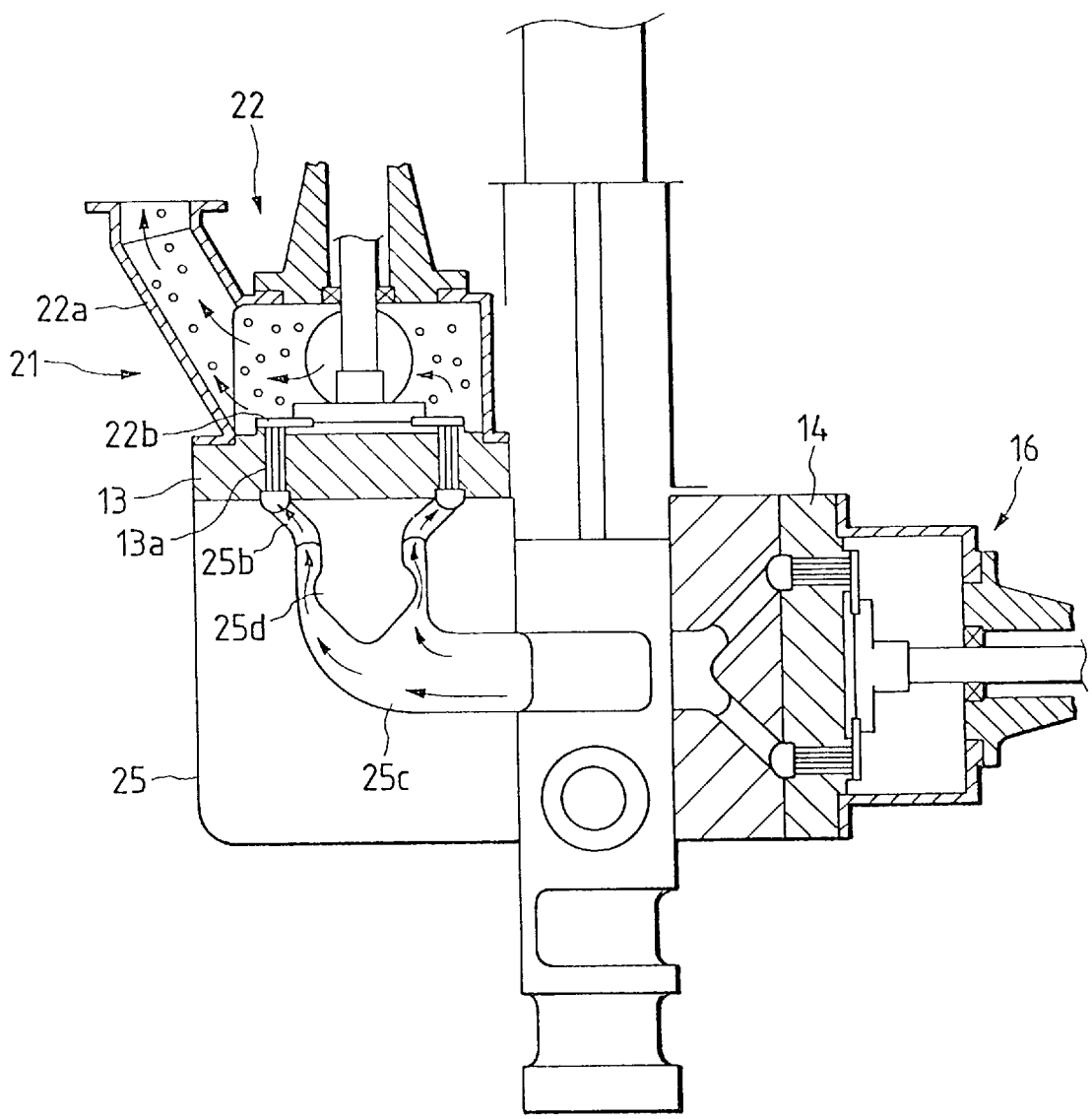
FIG. 5 is a cross-sectional view of a second embodiment corresponding to FIG. 2.

Referring to the accompanying drawings, a preferred embodiment of the granulating method and granulating device for thermoplastic resin of the present invention will be explained in detail below. FIG. 1 is a cross-sectional plan view of a granulating device for thermoplastic resin of a first embodiment of the present invention illustrating its primary construction. FIG. 2 is a cross-sectional view taken on line II—II in FIG. 1. FIG. 3 is a perspective view of a change-over valve rod. FIG. 4 is a cross-sectional plan view showing an applied example of the apparatus shown in FIG. 1. FIG. 5 is a cross-sectional view of a second embodiment corresponding to FIG. 2.

First Embodiment

In FIG. 1, reference numeral 1 denotes a two-shaft screw type kneading and extruding machine. The screw type kneading and extruding machine 1 includes two screws 3 which are inserted into an inner hole 2a of the cylinder 2, and the two screws 3 are meshed with each other and rotated in the same direction by a drive unit not shown in the drawing. In the arrangement shown in FIG. 1, a gear pump 4 is attached onto a front end surface 2b of the cylinder 2. A suction port 4a of the gear pump 4 is communicated with the inner hole 2a of the cylinder 2. A discharge port 4b of the gear pump 4 is connected with a die holder 5. In this connection, in some cases, there is provided no gear pump 4 as shown in FIG. 4. In the die holder 5, there is provided a substantially T-shaped passage 5c, on the side of which one inlet 5a and two annular outlets 5b are open. At a T-shaped confluence of the passage 5c, there is formed a first through-hole 5d in a direction crossing the passage 5c. In the passage 5c between the inlet 5a and the through-hole 5d, there is formed a second through-hole 5e crossing the passage 5c. Into the first through-hole 5d, a change-over valve rod 6 is inserted so that it can be slid in the axial direction of the through-hole 5d under the condition that a clearance between the change-over valve rod 6 and the first through-hole 5d is tightly sealed. Also, into the second through-hole 5e, a screen changer 7 is inserted under the condition that a clearance between the screen changer 7 and the second-through-hole 5e is tightly sealed. In this connection, the screw type kneading and extruding machine 1 includes the gear pump 4 and the die holder 5 as auxiliary components. As shown in FIG. 3, the columnar change-over valve rod 6 includes: a first cutout portion 6a to communicate the passage 5c of the die holder 5 with the left in FIG. 1 (in the direction of a low viscosity resin material granulating device 11 described later); a second cutout portion 6b to communicate the passage 5c of the die holder 5 with the right in FIG. 1 (in the direction of a high viscosity resin material granulating device 12 described later); a third cutout portion 6c to communicate the passage 5c of the die holder 5 with both sides in FIG. 1; and a discharge port 6d to communicate the passage 5c of the die holder 5 with the outside. At one end of the change-over valve rod 6, there is provided a drive shaft 6e extending in the axial direction. One end portion of the drive shaft 6e is connected with a reciprocating drive unit 6f which reciprocates the drive shaft 6e in the axial direction.

In the die holder 5, there are provided two outlets 5b. One outlet 5b is connected with one set of granulating device 11 having a die 13 and a cutting unit 15 used for a submerged granulating device, and the other outlet 5b is connected with one set of granulating device 12 having a die 14 and a cutting unit 16 used for a submerged granulating device. That is, two sets of granulating devices 11, 12 are respectively connected with the two outlets 5b of the die holder 5. One set of granulating device, for example, the left granulating device 11 shown in FIGS. 1, 2 and 4 is used for granulating resin material of low viscosity, and the other set of granulating device, for example, the right granulating device 12 is used for granulating resin material of high viscosity. The dies 13, 14 are substantially formed into disks. In the dies 13, 14, there are formed a plurality of nozzles 13a, 14a penetrating in the thickness direction of the dies. The nozzles 13a, 14a are annularly arranged round the centers of the disk-shaped dies. Reverse surfaces of the dies 13, 14 are connected with the die holder 5 so that the nozzles 13a, 14a, which are arranged annularly, can be communicated with the outlets 5b which are open annularly. Front surfaces of the dies 13, 14 are connected with the cutter units 15, 16. The cutter units 15, 16 include: water chambers 15a, 16a in which cooling water circulates, to connect the cutter units 15, 16 with the dies 13, 14; a plurality of cutters 15b, 16b rotated along the nozzles 13a, 14a on the surfaces of the dies 13, 14; cutter shafts 15c, 16c to hold the cutters 15b, 16b and transmit the rotary drive force; and drive units 15d, 16d to drive the cutter shafts 15c, 16c. The granulating device 11 is used for granulating resin material of low viscosity, the number of nozzles 13a formed in the die 13 is small, and a large number of sharp cutters 15a are arranged and the rotary speed of the cutters is set at a low value. The granulating device 12 is used for granulating resin material of high viscosity, the number of nozzles 14a is large, and a small number of cutters 16a are arranged and the rotary speed of the cutters is set at a high value.

Actual operation to be conducted in the above apparatus for granulating thermoplastic resin will be explained below.

When resin material of low viscosity is polymerized in the polymerizing apparatus and then granulated, first, powdered resin material is fed from a feed port (not shown) to the screw type kneading and extruding machine 1. Then the powdered resin material is kneaded and melted by the screws 3 rotated in the cylinder 2. The thus melted resin material is extruded from an end of the cylinder 2 to the gear pump 4 by the conveying action of the screw 3. Next, the pressure of the melted resin material is increased by the gear pump 4, and it is extruded into the die holder 5. In the die holder 5 in which the first cutout portion 6a of the change-over valve rod 6 is communicated with the passage 5c, foreign objects such as pieces of resin which have not been melted yet are filtered and removed by the screen 7a. Then the melted resin flows to the left in FIG. 1 via the first cutout portion 6a of the change-over valve rod 6. After that, the melted resin is extruded from the outlet 5b to the granulating device 11 for granulating resin material of low viscosity. In the granulating device 11, the melted resin material is extruded from a large number of nozzles 13a of the die 13 into the water chamber 15a in which cooling water circulates. In this case, the melted resin material is extruded in the form of pieces of string. The thus extruded resin material is cut by the cutter 15b into small pieces and cooled and solidified at the same time. The cooled and solidified resin material is discharged from the water chamber 15a together with cooling water which is circulating. Then the pieces of resin material are collected by a device not shown in the drawing and dried and classified. In this way, granular resin products referred to as pellets can be produced.

When resin material of high viscosity is polymerized and granulated by changing the operating conditions of the polymerizing apparatus, the second cutout portion 6b of the change-over valve rod 6 is communicated with the passage 5c, and resin material is made to flow to the right in FIG. 1 and extruded to the granulating device 12 used for granulating resin material of high viscosity. In this way, resin material is granulated in the same manner as described before. In this connection, at a point of time when the viscosity of resin material is changed, resin material of intermediate viscosity is generated in a short period of time. When it is desired to remove the resin material of intermediate viscosity, the discharge port 6d of the change-over valve rod 6 is communicated with the passage 5c. Due to the foregoing operation, the resin material of intermediate viscosity can be discharged outside without extruding it into the granulating devices 11, 12. In the case where the granulating operation is changed over from the granulating device 11 used for resin material of low viscosity to the granulating device 12 used for resin material of high viscosity, a quantity of heat given to the die 13 of the granulating device 11 used for resin material of low viscosity is reduced, and the nozzles 13a are filled with substantially softened resin material except for outer surfaces of the nozzles 13a, and at the same time, the water chamber 15a is filled with cooling water. When the above condition is upheld, the resin material, which has been filled in the nozzles 13a and the passage 5c on the side of the granulating device 11 used for granulating resin material of low viscosity, is not contacted with air, so that the deterioration of resin material caused by oxidization, and the resin material upheld in the softening condition can be easily heated to a melting condition. Accordingly, when the successive resin material of low viscosity is granulated, it is easy to resume the granulating operation.

When the resin material to be granulated is changed from resin material of high viscosity to resin material of low viscosity, the cutout portion of the change-over valve rod is changed over in the same manner as that described above.

When the resin material of the same viscosity is continuously produced over a long period of time and also when they have affluent polymerizing apparatuses and two-shaft type kneading and extruding machines 1, it is possible to respectively connect two granulating devices of the same function with the two outlets 5b, and the third cutout portion 6c of the change-over valve rod 6 is communicated with the passage 5c. Due to the foregoing arrangement, two sets of granulating devices can be simultaneously operated for granulation.

Second Embodiment

FIG. 5 is an arrangement view of a second embodiment of the present invention in which a vertical type granulating device 21 used for granulating resin material of low viscosity is provided. When the die 13 is vertically arranged and the nozzles 13a are horizontally arranged as shown in FIG. 1 in the case of resin material of extremely low viscosity, the resin material drips from the surface of the die 13, so that the resin material adheres onto the surface of the die 13. When the adhering resin material can not be perfectly wiped off from the surface, the resin material adheres onto the cutters 15b which come close to the surface in the cutting operation. Therefore, a gap is generated between the surface of the die 13 and the cutters 15b. In this case, a failure in cutting is caused when the resin material is cut with the cutters. In order to solve the above problems, the following countermeasures are taken in this embodiment. The die 13 is horizontally arranged at a position higher than the outlet of the screw type kneading and extruding machine 1, so that the nozzles 13a are vertically arranged. Therefore, resin material is extruded upward. Since the die 13 is horizontally arranged in this embodiment, in the die holder 25, the shape of the passage 25c, which is connected to the vertical type granulating device 21 used for granulating resin material of low viscosity, is different from the shape of the conventional passage. That is, the horizontal passage 25c communicated with the change-over valve rod 6 is curved upward by an angle of 90° and communicated with the exit 25b which is open to the horizontal outer surface. In the passage 25c, there is provided a flow rate adjusting ring 25d to make the flow velocity uniform in a portion where the passage 25c is curved by an angle of 90°. The shape of the water chamber 22a of the cutter unit 22 of the vertical type granulating device 21 is different from that of the first embodiment shown in FIG. 1. Except for the above point, the vertical type granulating device 21 of the second embodiment is the same as the first embodiment shown in FIG. 1.

In the vertical type granulating device 21 as described above, the melted resin material of low viscosity flows horizontally in the passage 25c of the die holder 25. Then, it flows vertically and passes in the flow rate adjusting ring 25d, the section of which is annular. Accordingly, a flow rate of the melted resin material is made uniform in the annular direction of the cross section of the passage. After that, the melted resin material is extruded from the discharge port 25b, the shape of which is annular. Then the melted resin material is vertically extruded upward from the nozzles 13a of the die 13 into cooling water and cut into small pieces with the cutters 22b. Since the die 13 is located at a position higher than the extruding port of the screw type kneading and extruding machine 1, the melted resin material is completely filled in a space between the horizontal portion of the passage 25c and the nozzles 13a of the die 13 located in an upper position. Since the surface of the die 13 is arranged horizontally, no resin material flows or drips on the die surface even immediately before the start of operation. Due to the foregoing, a failure in cutting is not caused at the start of operation.

In the above explanation, the two-shaft screw type kneading and extruding machine is used for kneading and extruding resin material. However, the present invention is not limited to the above specific embodiments. As long as it is a screw type continuous kneading and extruding machine, any type kneading and extruding machine may be used, for example, a single shaft type kneading and extruding machine, multi-shaft type, the same direction rotating type, different direction rotating type, engaging type and unengaging type may be used. The number of discharge ports of the die holder, that is, the number of granulating devices is not limited to two, but it is possible to arrange 3 or 4 granulating devices. Further, the granulating device is not limited to a submerged granulating device, but it is possible to adopt an aerial granulating device, that is, it is possible to adopt an appropriate type granulating device in accordance with the physical property of resin material.

REFERENCE EXAMPLE

In this reference example, polypropylene was used as resin material, the viscosity MI of which was 0.2 to 150. This resin material was granulated to produce a resin product of high viscosity, the value of which was MI=0.2 to 50. Also, this resin material was granulated to produce a resin product of low viscosity, the value of which was MI=70 to 150. In this case, a granulating device used for resin material of high viscosity corresponding to MI=0.2 to 50 was used, and also a granulating device used for resin material of low viscosity corresponding to MI=100 to 150 was used. When the resin material was granulated with the above granulating devices, resin products (pellets) of all grades were produced in good conditions.

The following effects can be provided by the granulating method and granulating device for thermoplastic resin of the present invention.

(1) In one screw type kneading and extruding machine provided with a plurality of granulating devices by which resin materials of different viscosity can be processed, the granulating device is changed over with respect to resin material, the viscosity of which changes in accordance with the lapse of time. Due to the foregoing, granulation can be continuously conducted without stopping the operation of the apparatus.

(2) Accordingly, it is possible to continuously produce resin products (pellets) of viscosity (grade) in a wide range by one screw type kneading and extruding machine.

(3) It is not necessary to stop and replace a screw type kneading and extruding machine each time the viscosity of resin material is changed.

(4) Consequently, it is possible to avoid the occurrence of waste resin when the apparatus is stopped, overhauled and assembled in the case of changing the viscosity of resin material.

What is claimed is:

1. A granulating device for thermoplastic resin material, comprising:

a screw kneading and extruding machine for kneading, extruding and melting the thermoplastic resin material;

a die holder connected to a front end portion of said screw kneading and extruding machine, said die holder including a passage through which the melted resin material flows, a change-over valve and at least two outlets and a discharge port, said passage selectively connected to said outlets with said change-over valve;

a first and a second dies, for forming the melted resin material into a plurality of pieces of string, connected respectively to said outlets to adapt to different ranges of viscosity of the melted resin material; and a first and a second cutter units including cutters moved respectively alone extruding plates of said first and second dies to cut the string-shaped resin material into small pieces, and cooling and solidifying sections for cooling and solidifying the small pieces of thermoplastic resin material, wherein at least one of said first and second dies is arranged in such a manner that said extruding plane thereof is horizontally disposed while it is directed upward.

2. The granulating device of claim 1, wherein another of said first and second dies is arranged in such a manner that said extruding plane thereof is vertically disposed.

3. The granulating device of claim 1, wherein said first and second dies are on opposite sides of said granulating device.

4. The granulating devices of claim 1, wherein one of said outlets corresponding to said die has an L-shape passageway including a horizontal portion and a vertical portion.

5. The granulating device of claim 4, wherein said die holder includes a flow rate adjusting ring located in said vertical portion of said L-shaped passageway.

6. The granulating device of claim 5, wherein said flow rate adjusting device defines an annular passageway through which said melted resin material flows.

* * * * *